United States Patent

Akitsu et al.

[11] Patent Number: 5,178,700
[45] Date of Patent: Jan. 12, 1993

[54] NON-SKID DEVICES FOR TIRES

[75] Inventors: Yasuo Akitsu, Handa; Kuniharu Kondo, Nagoya, both of Japan

[73] Assignee: NGK Insulators, Ltd., Japan

[21] Appl. No.: 334,139

[22] Filed: Apr. 6, 1989

[30] Foreign Application Priority Data

Apr. 12, 1988 [JP] Japan .................. 63-89577

[51] Int. Cl.⁵ ............................................. B60C 27/08
[52] U.S. Cl. ................ 152/222; 152/213 A; 152/239
[58] Field of Search ............ 152/210, 213, 167, 208, 152/211, 212, 221, 222, 213 R, 213 A, 239

[56] References Cited

U.S. PATENT DOCUMENTS

| 862,435 | 8/1907 | Bartel | 152/210 |
| 890,191 | 6/1908 | Stimpson | 152/210 |
| 902,015 | 10/1908 | Stimpson | 152/210 |
| 925,052 | 6/1909 | Stimpson | 152/210 |
| 935,331 | 9/1909 | Stimpson | 152/210 |
| 935,332 | 9/1909 | Stimpson | 152/210 |
| 3,786,849 | 1/1974 | Loqvist | 152/210 |
| 4,391,314 | 7/1983 | Inamoto et al. | 152/210 |

FOREIGN PATENT DOCUMENTS 59-14364 4/1984 Japan .
0011405 1/1988 Japan ............... 152/213 R Primary Examiner—Michael W. Ball
Assistant Examiner—Francis J. Lorin
Attorney, Agent, or Firm—Parkhurst, Wendel & Rossi

[57] ABSTRACT

A tire non-skid device including a net-like tire chain body, metal shanks planted in the tire chain body, and ceramic spikes fixed to tip ends of the metal shanks.

7 Claims, 2 Drawing Sheets

NON-SKID DEVICES FOR TIRES

BACKGROUND OF THE INVENTION (1) Field of the Invention

The present invention relates to an improvement of tire non-skid devices, which are used in the state that they are fitted to tires of vehicles for ensuring safe running on icy roads, snowy roads, etc.

(2) Related Art Statement

As measures for ensuring safe running on icy or snowy roads, there are well known stud tires in which studs made of a conventional hard alloy are studded directly into the tire. However, the stud tire has the shortcoming in that when it runs on a dry road, the studs rapidly wear. For instance, when a stud tire is subjected to a running test on a dry road, that is, when the stud tire with chrom-molybdenum steel studs is run on a general road at an average speed of 30 km/h for 1 hour, on a bad road at the average speed of 25 km/h for 30 minutes, and on an express highway at the average speed of 80 km/h for 30 minutes in the state that the tire is fitted to a passenger car having a displacement of 2,000 cc, the stud wears by as much as about 2 mm. Thus, its non-skid effect is greatly lowered. Further, such studs made of the above conventional metal are likely to be corroded with an anti-freezing agent or water present on the roads. If wearing and corrosion are co-existent, the wearing is promoted extremely. Thus, as shown in Japanese Patent Publication No. 59-14,364, it has recently been proposed that the conventional metal studs are replaced with those made of a ceramic material having excellent corrosion resistance and wear resistance. However, in this case, there still exists another problem as to the stud tires. That is, since it is not easy to attach or detach the stud tire to or from the wheel, it is actually impossible that the tire is briskly detached when it runs on the dry road unlike tire chains. This also provokes the above wearing problem.

SUMMARY OF THE INVENTION

The present invention has been accomplished to eliminate the above-mentioned conventional problems, and to provide a tire non-skid device which allows easy attachment and detachment, suffers substantially no wearing of studs contacting the roads, and has an excellent non-skid effect.

The present invention is characterized in that shanks made of a metal are planted in a net-like tire chain body, and that ceramic spikes are fixed to tip ends of the metallic shanks.

These and other objects, features and advantages of the invention will be appreciated upon reading of the following description of the invention with the understanding that some modifications, variations, and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein.

DETAILED DESCRIPTION OF THE INVENTION

The present invention will be explained in more detail with reference to the attached drawings.

Figure 1:
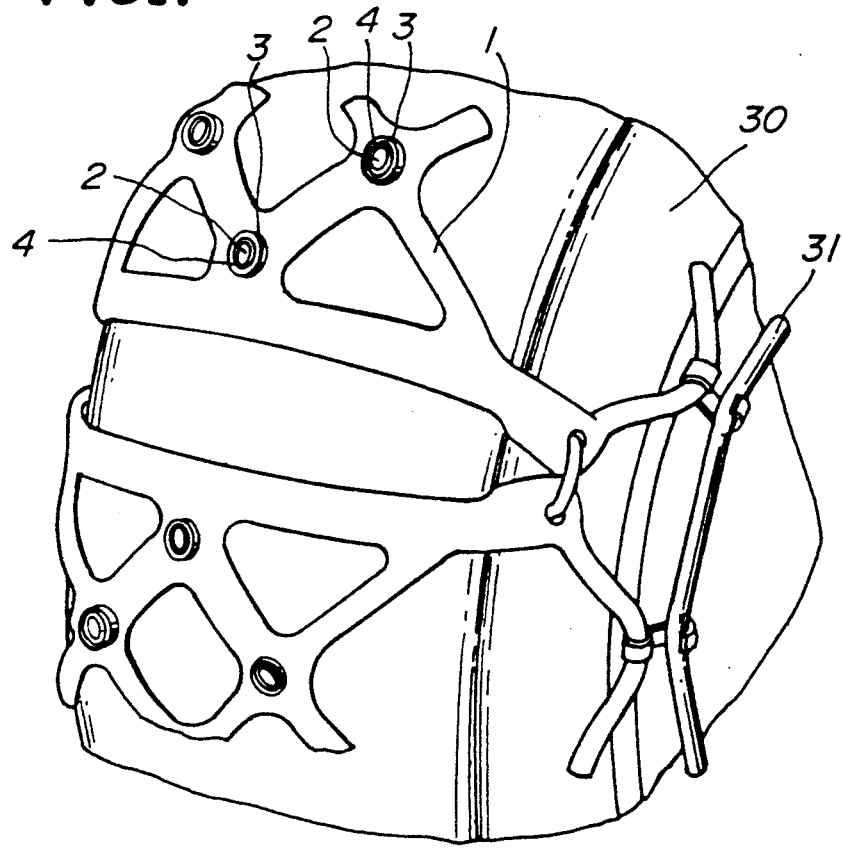
FIG. 1 is a perspective view of an embodiment of the present invention.

In FIG. 1, a reference numeral 1 is a net-like tire chain body, which is to be fitted to a tire 30 by means of rubber bands 31. Reference numerals 2 and 3 denote a metal shank planted in the chain body 1, and a ceramic spike fixed to a large diameter portion 2a at the tip of the shank 2, respectively. It is preferable to employ, as the net-like tire chain body, a resin having excellent elasticity to prevent damage of tires, such as urethane base resin. The thickness of the chain body is sufficient to be several millimeters or so. The material of the ceramic spikes 3 is not particularly limited, but a variety of ceramic materials such as alumina based ceramics or zirconia based ceramics may be used. As shown in the following Table, when partially stabilized zirconia (hereinafter referred to as PSZ) having excellent strength, toughness, and wear resistance is used as a wear resisting material, extremely excellent effects can be obtained for tire spikes upon which shocks are constantly applied.

TABLE

|  | Alumina $Al_2O_3$ | PSZ $ZrO_2$ | Silicon nitride $Si_3N_4$ | Silicon carbide SiC |
|---|---|---|---|---|
| Density (g/cm$^3$) | 3.98 | 5.91 | 3.26 | 3.10 |
| Bending strength (MPa) | | | | |
| room temperature | 440 | 1,020 | 880 | 500 |
| 1,000° C. | 340 | 450 (800° C.) | 510 | 475 |
| Fracture toughness ($K_1C$ (MN/m$^{3/2}$) | 4.5 | 8.5 | 7.0 | 2.4 |
| Coefficient of thermal expansion ($\times 10^{-6}$/°C.) | 8.1 | 10.5 | 3.3 | 4.3 |
| Thermal conductivity (cal/cm.sec.°C.) | 0.05 | 0.007 | 0.07 | 0.14 |
| Thermal shock temperature (°C.) | 200 | 350 | 900 | 370 |

Note:
The above values are all representative in products pressurelessly sintered.

Figure 2:
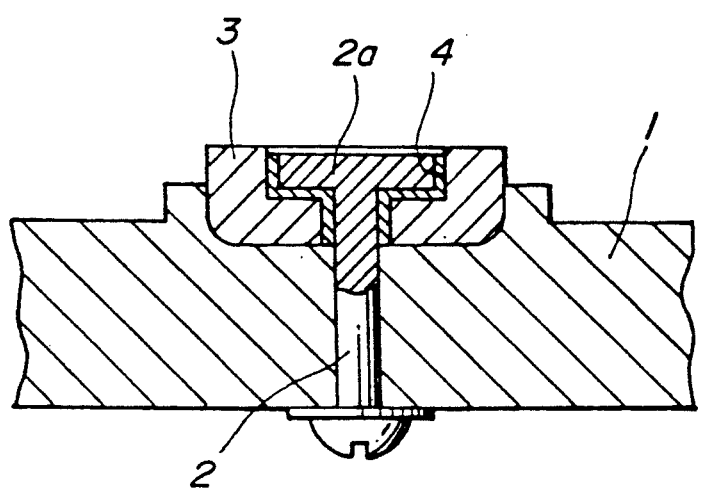
FIG. 2 is an enlarged sectional view of a principal portion of the embodiment in FIG. 1.
Figure 3:
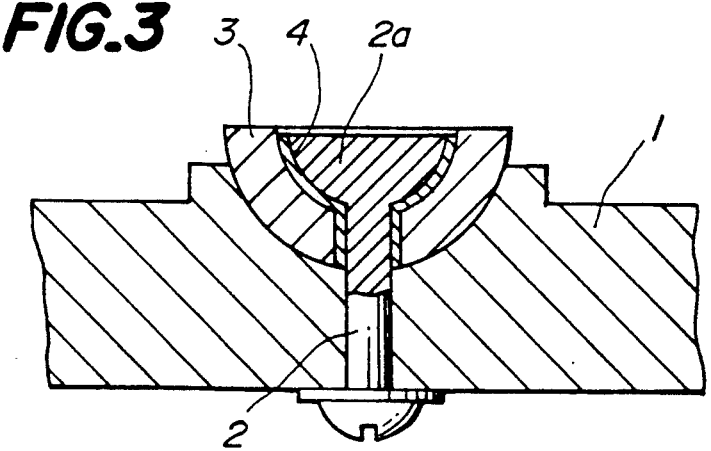
FIG. 3 is an enlarged sectional view of a principal portion of a second embodiment according to the present invention.

As shown in FIGS. 2 and 3 in an enlarged scale, the ceramic spike 3 is fixed to a large diameter section 2a which is formed by caulking a tip end of the metal shank. In the illustrated embodiments, an elastic member 4 is interposed between the ceramic spike 3 and the metal shank 2, while the elastic member is bonded to the spike and the shank. The elastic member 4 is adhered to the outer peripheral surface of the large diameter portion 2a, and is made of a resin having excellent cooling and heating resistance, fatigue resistance, vibration absorbing characteristic, weather resistance, and durability, such as a polyurethane resin or a silicone resin. The thickness of the elastic member is preferably not more than 2 mm in the thickness direction and not more than 0.5 mm in the radial direction.

The shape of the ceramic spike 3 is cylindrical as shown in FIG. 2, or the bonded surface between the large diameter section 2a of the metal shank 2 is semispherical or semi-elliptical as shown in FIG. 3, so that stress concentration is released. Alternatively, the shape of the ceramic spike may be sectionally rectangular with rounded edges. Further, as shown in FIGS. 2 and 3, the ceramic spike may have a ring-like shape ground contact face. In this case, since a non-skid effect is produced at an inner edge portion of the spike, more preferable effect can be obtained.

Figure 4:
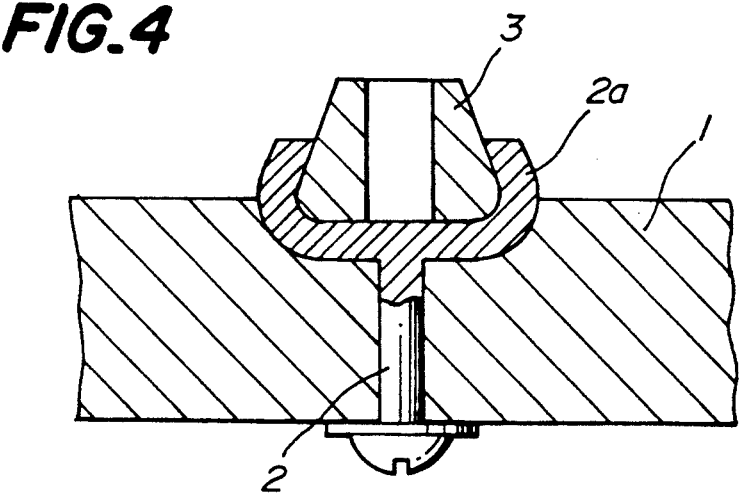
FIG. 4 is an enlarged sectional view of a principal portion of a third embodiment according to the present invention.
Figure 5:
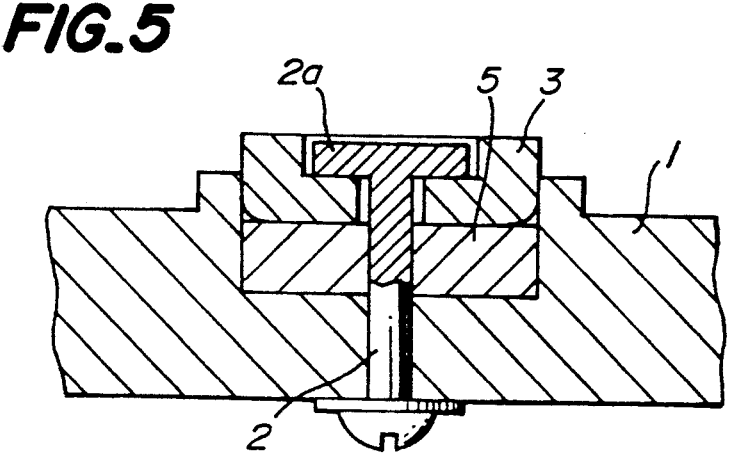
FIG. 5 is an enlarged sectional view of a principal portion of a fourth embodiment according to the present invention.

FIG. 4 shows a third embodiment according to the present invention. A ceramic spike 3 is shaped in a tapered form (i.e., as partial frustoconical, hollow cones), which is outwardly caulked by a large diameter portion 2a of a metallic shank 2 to enclose it. Thereby, the ceramic spike is fixed to a chain body 1. FIG. 5 shows a modification of the embodiment in FIG. 4. A thick elastic member 5 is provided at the rear surface of the ceramic spike 3, so that an outwardly projecting amount of the ceramic spike 3 may be adjusted depending upon hardness of roads. That is, the thick elastic member 5 constructed so that the ceramic spikes are greatly projected on soft roads like snowy roads, while their projecting amount is reduced in the case of hard roads, dry roads and icy roads. A spring, a leaf spring or the like may be used as the elastic member 5.

When in use, the thus constructed non-skid devices are fitted to tires in vehicles like conventional net-like tire chains, and enable safe running of the vehicles through the non-skid effect of the net-like body 1 itself and through the non-skid effect due to biting of the ceramic spikes 3 into snow or ice. Further, since the ceramic spikes 3 having excellent wear resistance are used as the spikes according to the present invention, wear at the ground-contacting surfaces of the non-skid device can be reduced as compared with that of metallic spikes. Further, in the case that the elastic member 4 is interposed between the ceramic spike 3 and the metallic shank 2 such that the elastic member closely adheres to the peripheral surface of the large diameter portion 2a of the shank, even when the caulked portion slackens owing to vibrations during running, wearing due to direct contact between the ceramic spike 3 and the metallic shank 2 is prevented. In addition, since the elastic member 4 prevents foreign matters such as sand grains from invading between the ceramic spike 3 and the metallic shank 2, abnormal wearing or breakage can be prevented. Further, impacts which are borne by the ceramic spikes 3 are mitigated, so that occurrence of noises or vibrations is effectively prevented. In particular, when the elastic member 4 is bonded to the metallic shank 2 and the ceramic spike 3, a more complete effect for preventing invasion of foreign matter can be obtained. Furthermore, since the tire non-skid device according to the present invention can easily be attached to or detached from the tire wheel, the device can be detached briskly whenever the tire is to be run on dry roads. In this respect, longer use life can be obtained.

With respect to a tire non-skid device using spikes made of PSZ with elastic members 4 interposed and the same non-skid device except that the elastic members 4 were omitted, the non-skid device was fitted to a passenger car having a displacement of 2,000 cc, and subjected to a dry road running test under the foregoing conditions. Although five ceramic spikes were broken among eighty spikes in the latter case, no abnormality occurred and almost no change was recognized in the former case in which the spikes were worn by 0.5 mm or less. The breakage occurred from the joined surfaces between the metallic shanks 2 and the ceramic spikes. A test was further conducted while eight spikes made of alumina were used in replacement of PSZ, and it was confirmed that the PSZ spikes exhibited more excellent results as compared with the alumina spikes.

As is clear from the foregoing explanation, in the present invention, wear at the ground contact portions and the joining portions to the metallic shanks in the spikes is extremely small, the non-skid device can easily be attached to or detached from the tire, and an excellent non-skid effect, comparable to that in the conventional product, can be obtained. Therefore, the present invention greatly contributes to development in the industry as providing a non-skid device which eliminates the problems experienced by conventional devices.

What is claimed is:

1. A tire non-skid device, comprising:
a net tire chain body having an inner surface and an outer surface adjacent a road surface;
a plurality of metal shanks extending through said tire chain body, each of said shanks having a first end abutted against said inner surface of said tire chain body, and a second end protruding from said outer surface of said tire chain body;
a plurality of ceramic spikes, one of said ceramic spikes being fixed to each of said metal shanks at said second end thereof; and
a plurality of elastic members, one of said elastic members being interposed between each of said metal shanks and said ceramic spikes.

2. The tire non-skid device of claim 1, wherein each of said ceramic spikes extends radially outwardly beyond said second end of said metal shanks.

3. The tire non-skid device of claim 1, wherein said second end of said metal shanks is fixed around an outer periphery of each of said ceramic spikes.

4. The tire non-skid device of claim 3, wherein said ceramic spikes are shaped as partial frustoconical, hollow cones.

5. The tire non-skid device of claim 1, wherein the ceramic spikes comprise a material selected from the group consisting of a zirconia base ceramic, an alumina base ceramic, a silicon nitride base ceramic and a silicon carbide base ceramic.

6. The tire non-skid device of claim 1, wherein the elastic members comprise a material selected from the group consisting of polyurethane resin and silicone resin.

7. The tire non-skid device of claim 1, wherein an end portion of the ceramic spike which contacts the road surface is substantially cylindrical.

* * * * *